Feb. 9, 1943.   W. J. MILLER   2,310,859
MANUFACTURE OF POTTERY WARE
Filed April 6, 1940
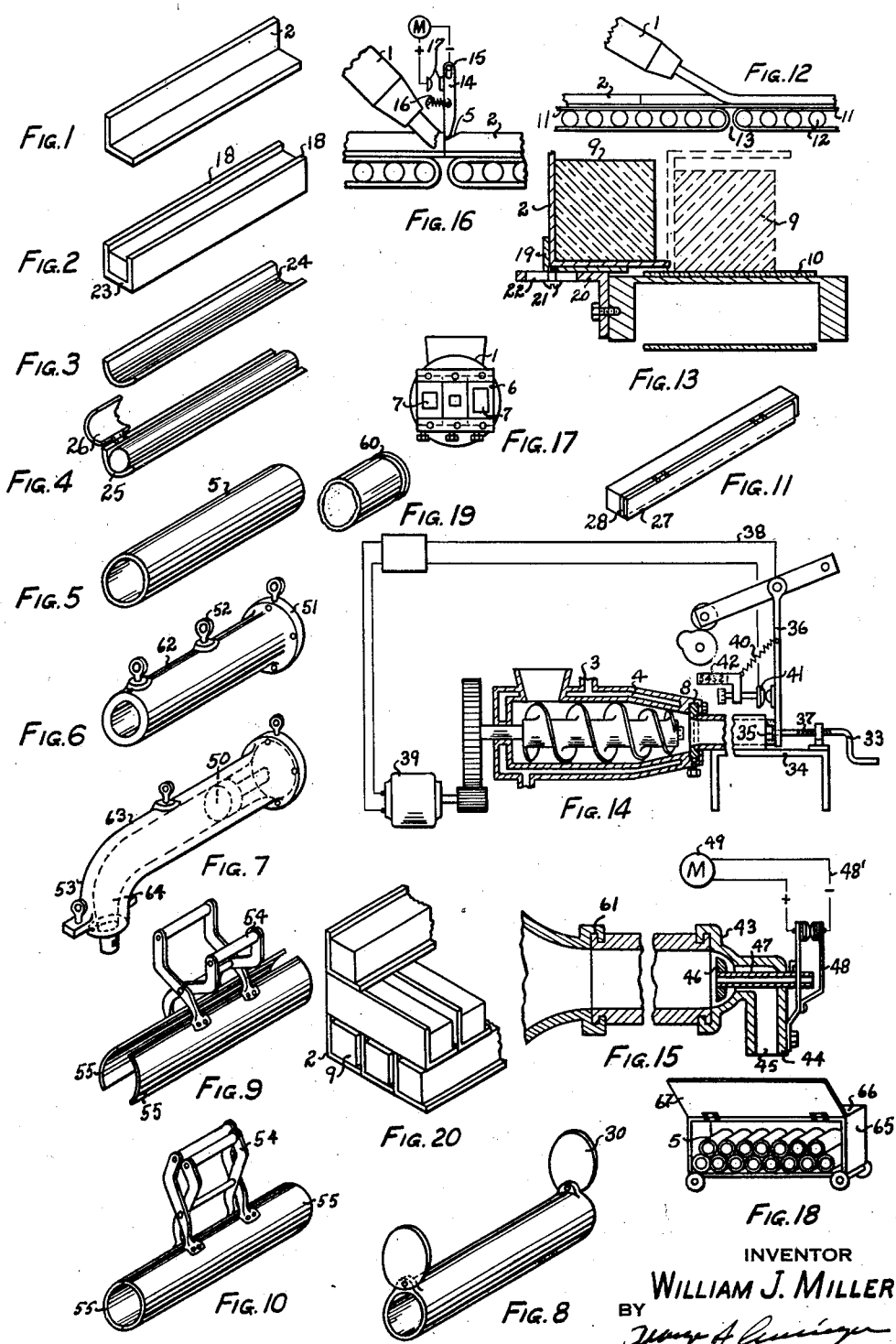
INVENTOR
WILLIAM J. MILLER
BY
ATTORNEY Patented Feb. 9, 1943

2,310,859

UNITED STATES PATENT OFFICE 2,310,859

MANUFACTURE OF POTTERY WARE

William J. Miller, Swissvale, Pa.

Application April 6, 1940, Serial No. 328,365

6 Claims. (Cl. 25—1)

This invention relates to apparatus for manufacturing pottery ware and has to do with machinery for preparing slugs of clay from which mold charges are made.

In the present invention, clay is extruded in the form of a solid column of material into containers in which the clay is transported to an emptying position. The present invention relates particularly to the matter of controlling the charging or filling of the receptacles with clay.

In the making of pottery ware according to the method and apparatus described in my copending application, Serial No. 47,990, it is desirable to apply the charge of plastic clay securely to the mold in the form of a bat of predetermined form of the correct volume, contour, thickness, diameter and condition, and in a manner insuring the most efficient and economical formation to finished form in subsequent profiling operations and that the control of these factors should be reliable, convenient, and therefore as free from operation interruption as possible. For this purpose, carefully conditioned clay slugs of uniform predetermined size and shape or cross section are provided from which the charges are produced.

With reference to Figs. 1, 2 and 6, a plasticized mixture of ceramic ingredients is conditioned in a pug-extrusion mill 1 and extruded through the die being received in receptacles in the form of retaining angles 2, Fig. 5 or cylindrical cartridges 5, Fig. 3, for subsequent transportation to the feeder of the pottery forming machine, where said receptacles are emptied of clay, the clay being segregated into charges and fed to the molds. These receptacles are preferably treated with a substance such as castor oil to reduce adhesion of the clay thereto, but may be lined with a porous material such as felt to decrease adhesion or they may be unlined and untreated.

If desired, the pug-extrusion mill 1 may be provided with controlable connections 3, such as that shown in connection with the extrusion machine of Fig. 1, for conveying a heating medium such as steam, hot air or electricity to the chamber 4 in the shell thereof and/or the interior of the same to raise and control the temperature of the extruded clay, or the clay and water may be heated prior to insertion in the mill. The mouth of the pug has a pair of slots or grooves 8, such as that shown in Fig. 1, open at both ends, into which the orificed die can be slidingly inserted.

The angles, pallets or receptacles 2 serve to reserve the shape of the extruded slug of clay.

The slugs and also the supporting receptacles 2 are made to a size suited to the size of the ware being made, thus, when a large charge is necessary, slugs of larger cross section are employed than when making small ware. The maintenance of cross sectional uniformity of the slug, at least up to the point where the process of charge preparation commences, is of supreme importance, as it provides for subsequent accurate segregation of charges having a uniform bulk. Also, the compacting of the clay in the orifice of the extrusion machine serves to improve and make more uniform the density of the clay, besides eliminating cavities or other defects in the clay which might be reflected in the ware subsequently made. Any lapping or junction marks in the clay prior to application to the mold may have a detrimental effect on the ware produced and it is desirable after slugs leave the orifice of the extrusion machine to avoid any mastication or lapping over effect tending to produce lines of juncture.

A frame housing a series of belts 11 supported on rollers 12, Fig. 6, suitably supported in position under the orifice of the elevated pug mill 1, serves to support the receptacles 2 in endwise abutting relation to receive the relatively limber slugs as they emerge from the extruding orifice, and to provide clearance for inserting and supplying empty receptacles 2, I arrange the orifice of the extrusion machine die at the lower side of the casing.

The receptacles 2 and deposited slugs are moved to the right, Fig. 6, by the force of the extruded clay and to avoid distortion of the slugs by reaction of the receptacles, the belts 11 are sloped slightly downwards from the mouth of the extrusion machine to thereby gravitate the receptacles away from the orifice. It will be understood that this arrangement may include a multiple of belts 11 arranged in side by side relation each having an extrusion machine associated therewith and therefore each belt would support an individual line of receptacles 2. If a multi-orifice pug mill was utilized, then an individual line of belts 11 could be associated with each orifice. Since all of the slugs from either a multi-orifice pug mill or a battery of pug mills would not be produced at uniform speed, particularly where there was a variation in the size and shape of the slug, or when clay is fed to the pug at no uniform predetermined rate, the independent belt arrangement permits the column of clay in any particular line to be received on the supports at the speed of production independently of any other line of supports. A gap 13 between the belts, Fig. 6, facilitates cutting the slugs at the joints between the angles, a wire being preferably used for this purpose.

The slug sizes may also be progressively stepped in height for each given width and the widths are also progressively stepped to thereby provide a slug having a cross section best suited to the production of a compact charge when segregated. To avoid complication, a minimum number of slug sizes should be used.

Fig. 6 discloses an arrangement wherein the operation of the extrusion machine may be interrupted after each receptacle is filled in order that the slug may be cut off and the receptacle removed. In this arrangement, one corner of the vertical wall of a receptacle 2 is bevelled off at 9 so as to provide a notch 9a when in abutting relation with the next succeeding receptacle. The tip of a switch lever 14, vertically slidable on the pivot 15, is connected in circuit with the motor driving the pug mill, and normally rides the upper marginal surface of the vertical wall of the receptacle whilst spring 16 holds the contacts 17 closed, thereby energizing the motor. When the lever 14 drops into the notch between abutting receptacles, it is forced to the right, breaking the circuit and de-energizing the motor, thereby stopping extrusion. The operator lifts the lever 14 out of the way, cuts off the slug and restarts the operation of the pug by closing the switch.

The receptacle 2 shown in Fig. 1 comprises a body portion substantially L shaped in cross section, the side wall and bottom preferably being contiguous. The receptacle is adapted to receive and support clay slugs of square, rectangular or triangular proportions and is constructed of rigid material, such as a non-staining metal, wood fibre, or a composition answering the specification. It may be made in one piece or a plurality of pieces joined together by any suitable securing means. The vertical wall need not be at an angle of 90° as shown but may be inclined at any angle necessary to accommodate the cross sectional shape of the slug.

Fig. 3 discloses another form of receptacle subserving the purposes of the receptacle of Fig. 1. Being in the form of a rigid hollow cylinder, said receptacle, besides functioning as a transportable support capable of preserving the extruded shape of the material whilst in storage and/or transit, also provides additional amount of protection to the surface of the clay against contamination and drying out. The receptacle is adapted to be used with automatic feeding mechanism such as that shown in my Patent No. 2,294,926.

In filling the receptacle with clay, one end thereof may be positioned in a locating groove in the pug mill die, Fig. 1, and the screw clamp 33 tightened against the opposite end, the receptacle being supported on a table 34. When the receptacle is filled with clay, the material extruding around the clamp bar 35 forces the forked switch lever 36 straddling the screw 37 to the right, thereby opening the circuit 38 and stopping the motor 39 and pug mill. The filled receptacle may be then removed and an empty one inserted and the motor controlling relay restarted, the spring 40 holding the switch closed until opened again by clay extruding out the back end of the cylinder. An adjustable contact 41 and graduated scale 42 permits adjustment of the extent of extrusion to the requirement of receptacles of different length.

The receptacle of Fig. 5 may also be filled as shown in Fig. 2. In this case, the ends of the receptacle are preferably provided with circular grooves 60, Fig. 4, and these grooves are fitted into parallel upper and lower slides 61 formed in the nozzle of the pug mill. A cap 43, similarly interlocked with the opposite end of the cylinder, has downwardly extending nozzle 44 with a vent passage 45 therein communicating with the interior of the receptacle. 46 is a valve closure mounted on hollow stem 47, for closing passage 45 when the cylinder fills with clay. The full pressure of the pug-extrusion mill is applied to the clay for compacting purposes until such time as a small stream extrudes through the hollow valve stem and forces the switch 48 open, thereby breaking the circuit 48' to the motor 49 and stopping the pug mill.

Having thus described my invention, what I claim is:

1. In combination, a machine for extruding pottery jiggering clay in the form of a solid column of predetermined cross section, a transportable receptacle adapted to receive said column upon extrusion and pressure operated means for interrupting the extrusion of clay from said machine when said receptacle is filled.

2. In combination, a machine for extruding plastic jiggering clay in the form of a solid column of predetermined cross section, a transportable receptacle shaped to fit the column of clay in cross section adapted to be filled with clay by the said machine, means for resisting the force of extrusion to thereby compact the clay in said receptacle and means for automatically stopping the extrusion of clay after said receptacle is filled.

3. In combination, an extrusion machine adapted to produce a solid column of pottery clay, a movable support located adjacent thereto, means in the form of transportable receptacles for receiving the extrusion, said receptacles being mounted on said movable support and shifted relative to the extrusion machine whilst being filled with clay and means controlled by the receptacles for interrupting the extrusion operation of the extrusion machine.

4. In the manufacture of jiggered pottery ware, the method which comprises, extruding clay in a solid column into a rigid transportable receptacle and when the receptacle is filled automatically discontinuing the extrusion, removing the receptacle to an emptying position and there dumping the clay out of the receptacle and feeding the clay to a charge segregating zone.

5. In combination, an extrusion machine and a refillable receptacle adapted to be filled with clay at the nozzle of the extrusion machine and means removably associated with one end of the receptacle operative to interrupt the operation of the extrusion machine when the receptacle is filled.

6. In combination, an extrusion machine and a tubular refillable receptacle adapted to be filled with clay at the nozzle of the pug mill, and a detachable cap for closing the open end of the receptacle when in association with the plug mill, said cap having a vent.

WILLIAM J. MILLER.